Sept. 6, 1938.    R. R. R. SARAZIN    2,129,241
APPARATUS FOR CONTINUOUSLY MEASURING TORQUES
Filed May 13, 1937

Inventor:
Raoul Roland Raymond Sarazin,
Attorneys

Patented Sept. 6, 1938

2,129,241

UNITED STATES PATENT OFFICE 2,129,241

APPARATUS FOR CONTINUOUSLY MEASURING TORQUES

Raoul Roland Raymond Sarazin, Saint-Prix, France

Application May 13, 1937, Serial No. 142,523
In Luxemburg March 15, 1937

9 Claims. (Cl. 265—25)

The present invention relates to apparatus for continuously measuring torques, and it is more especially, although not exclusively, concerned with apparatus of this kind for measuring the torque of an aircraft engine.

The object of the present invention is to provide an apparatus of the kind above referred to which is better adapted to meet the requirements of practice.

The essential feature of the apparatus according to the present invention consists in interposing between the driving element and the driven element a device such that the torque transmitted from one of these elements to the other one is balanced by the action of the centrifugal force on movable members, said members being thus moved away from their position of equilibrium through a relative angle which depends upon the speed of revolution of the engine and the value of said torque. In combination with this system, I provide means for giving at any time the value of the torque in accordance with the value of said angle and that of the speed of revolution.

Other features of the present invention will result from the following detailed description of a specific embodiment thereof.

A preferred embodiment of the present invention will be hereinafter described, with reference to the accompanying drawing, given merely by way of example, and in which:

Fig. 1 diagrammatically shows, in longitudinal section, a torque measuring apparatus made according to an embodiment of the present invention;

The invention concerns the construction of an apparatus for measuring, in a continuous manner, the value of the torque transmitted from a driving element to a receiving or driven element.

According to the invention, I interpose, between said elements, a device such that the torque transmitted from one of these elements to the other one is balanced by the action of the centrifugal force on movable organs carried by at least one of these elements, in such manner that, as a consequence of the transmission of this torque, said organs occupy a position different from that they would otherwise occupy if they were subjected merely to the action of the centrifugal force.

It is clear that with such an arrangement, the driving and driven elements make, with each other, an angle $\alpha$ which is proportional to, although less than, the angle $\gamma$. The angle $\gamma$ depends upon the speed of revolution $\omega$ and the torque.

According to the invention, I provide means for giving at any time the value of the torque C as a function of the speed of revolution $\omega$ and of said angle $\alpha$.

Concerning the first mentioned device, I advantageously arrange it in such manner that the movable members on which the centrifugal force is to act are oscillating members urged by said force toward a position of equilibrium from which the torque transmitted from the driving element to the driven element has a tendency to move them away. It will be readily understood that, with such an arrangement, instead of considering, for the determination of the torque transmitted, the angle $\alpha$ above referred to, it is possible to consider the angle $\gamma$ through which said oscillating members have rotated from their position of equilibrium. As a matter of fact, these two angles $\alpha$ and $\gamma$ are always a function of each other, whatever be the specific arrangement that is chosen.

In accordance with this principle, the device above referred to may include:

a.—Two coaxial pieces 1 and 2 respectively connected to the driving shaft 3 and to the driven shaft 4; and b.—Oscillating members for interconnecting these two pieces, said members coacting each with both of these pieces and including each an eccentric mass 5.

I may for instance have recourse to any of the following embodiments:

Rectilinear levers are provided, which carry each, at its external end, a mass 5, each of these levers being pivoted, about an axis parallel to the main shaft of the apparatus, to one of the pieces 1 and 2 and cooperating with a guide carried by the other piece. With such an arrangement, when no torque is transmitted, said levers assume radial positions under the effect of the centrifugal force, and when a torque is transmitted they become inclined to these radial positions at an angle which, for a given speed, depends upon the value of said torque.

Figure 1:
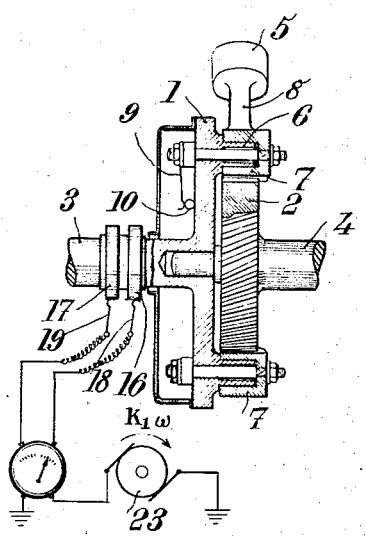
Figure 2:
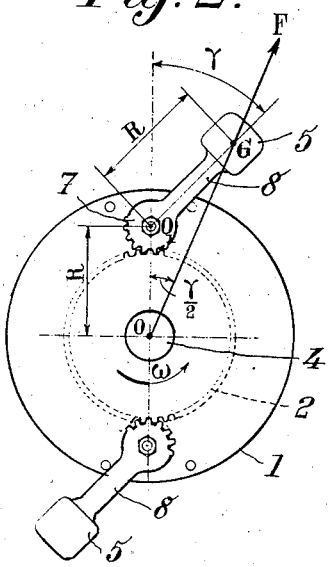
Fig. 2 shows, in elevational view, the mechanical part of this apparatus.

Advantageously, I make use of the arrangement shown by Figs. 1 and 2.

In this embodiment, piece 1, which is for instance given the shape of a circular plate or disc, is provided with a plurality of shaft elements 6 parallel to the main axis of the whole, located all at the same distance from said main axis and distributed at regular intervals along the periphery of said disc.

Piece 2 is provided with external teeth.

On each of the shaft elements 6, there is journalled a planet wheel, or, preferably, a toothed sector 7.

On each of these sectors, there is provided an arm 8 at the end of which is mounted a mass 5, all these arms 8 being preferably mounted in such manner as to be parallel to one another for all the angular positions they can occupy when shafts 3 and 4 occupy different angular positions with respect to each other.

Whatever be the particular embodiment that is chosen, it will be readily understood that the angle $\gamma$ through which the oscillating members are turned from their positions of equilibrium depends upon the value of torque C and the speed $\omega$ and that this angle $\gamma$ will remain constant for a given speed $\omega$ and a given torque C, whatever be the irregularities of rotation and the vibrations of torsion of the shafts, if the moment of inertia of the oscillating members about the axes of shaft elements 6 is sufficiently large.

If use is made of the specific arrangement illustrated by Figs. 1 and 2, in which the distance from the main shaft 0 of the apparatus to the axes $0^1$ of toothed sectors 7 has a value R equal to the distance from the axis $0^1$ of each of these sectors to the center of gravity of the corresponding mass 5, it is found that the value of the torque C is given by the formula:

$$k_1 \omega^2 \sin \gamma$$

in which $k_1$ is a constant depending, in particular, on the relative weight of the eccentric masses 5 and also upon the radii of the various toothed elements.

Concerning now the means for giving at any time the value of the torque C as a function of the angle $\gamma$ and the speed of revolution $\omega$, I find it is advantageous to make use of the electrical arrangement including a brush 9 moving along a resistance in accordance with the angular displacements of the oscillating members (for instance arms 8). For this purpose, it is advantageous to connect said brush 9 rigidly with one of the sectors 7, for instance through a central spindle connected to said sector and extending in the shaft elements 6 so as to project from the opposite face of the piece 1.

Figure 3:
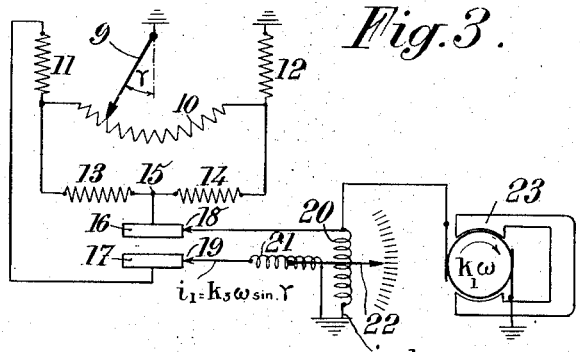
Fig. 3 is a diagrammatical view of the electrical part of this apparatus.
Figure 4:
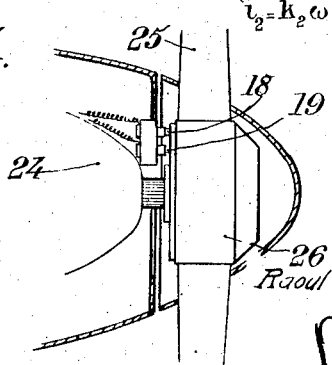
Fig. 4 shows, on a smaller scale, an apparatus according to the present invention combined with an airplane propeller.

Although it is possible to devise many embodiments of this electrical arrangement, it seems particularly advantageous to provide a system capable of directly giving the values of torque C, an example of such a system being given by Fig. 3.

According to this embodiment, to each of the ends of resistance 10, I connect, on the one hand a resistance 11, 12, and on the other hand, a second resistance 13, 14, the two last mentioned resistances having a common point 15 connected to a first ring carried either by shaft 3 or by shaft 4.

The free end of the resistance 12 is earthed and the free end of the resistance 11 is connected to a second ring 17, also carried either by shaft 3 or by shaft 4.

Advantageously, these resistances 10, 11, 12, 13 and 14 are arranged in a suitable casing carried for instance by piece 1 and turning together with it, from which casing extend the conductors necessary for ensuring the desired connections with rings 16 and 17.

With each of these rings coacts a brush 18, 19, respectively, which is connected to a measuring apparatus including a stationary winding 20 and a movable winding 21 rigid with the pointer 22 of the apparatus. Brush 18 is connected to one end of winding 20 the other end of which is earthed, and brush 19 is connected to one end of the winding 21, the other end of which is also earthed.

A direct current generator 23 is driven, preferably by the engine which drives shaft 3, at a speed $k_1\omega$, so as to supply a difference of potential proportion to $\omega$.

Finally, one of the terminals of this generator is earthed and the other one is connected to the first end of said winding 20.

With this arrangement, it is found that the current flowing through winding 20 has an intensity equal to $k_2\omega$, whereas the current flowing through winding 21 has an intensity equal to $k_3\omega \sin \gamma$, wherein $k_2$ is a constant which varies with the variations of $k_1$ and resistance 20, and $k_3$ is a constant the value of which is dependent on the value of resistances 10, 11, 12, 13 and 14.

The torque acting upon pointer 22 is therefore equal to $k_4\omega^2 \sin \gamma$, $k_4$ being a constant which is proportional to $k_1$, although different therefrom, and is likewise dependent on the relative weight of the masses. It is therefore proportional to the driving torque C and the dial in front of which pointer 22 moves may be provided with graduations indicating directly this driving torque.

Of course, the electrical arrangement which has just been described is given merely by way of example and anyone skilled in the art might find other arrangements giving the same result or similar results.

Whatever be the specific embodiment that is chosen, the operation and advantages of the apparatus according to the invention are believed to result sufficiently clearly from the preceding explanations.

It will be readily understood that the apparatus can be applied to very different fields.

However, when it is desired to measure the torque transmitted by an aircraft engine 24 to a propeller 25, it is advantageous to house the whole of the rotary part of the apparatus in the hub 26 of the propeller, the latter constituting, in this case, together with its hub 26, a unit capable of being fixed on the engine exactly as an ordinary propeller.

In this case, rings 16 and 17 may be located on the face of the hub turned toward the engine and the brushes 18 and 19 may be carried by a suitable support fixed to the end of the casing through which the driving shaft projects.

With this arrangement, I provide an apparatus the utilization of which is particularly simple and which permits, in particular, when the airplane is being tested in flight, of determining at any time the true power developed by the engine, since the number of revolutions thereof is known otherwise.

Of course, according to the invention, brush 9 might be moved by the relative displacements of elements 1 and 2 instead of being moved by the angular displacements of the oscillating members.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In connection with a system including a driving element and a driven element, an apparatus for continuously measuring the torque transmitted from the first element to the second one, which comprises, in combination, at least one member movably connected with both of said elements, at least one mass positively interconnected with said member, operative by the centrifugal force resulting from the rotation of said elements, for balancing the action of said torque on said member for a corresponding relative position of said member with respect to said elements, and means, responsive to displacements of said member from a predetermined relative position and to the speed of revolution of said elements, for indicating the value of said torque.

2. In connection with a system including a driving element and a driven element, an apparatus for continuously measuring the torque transmitted from the first element to the second one, which comprises, in combination, at least one member movably connected with both of said elements, a mass rigid with said member operative by the centrifugal force resulting from the rotation of said elements for balancing the action of said torque on said member for a corresponding relative position of said member with respect to said elements, and means, responsive to displacements of said member from a predetermined relative position and to the speed of revolution of said elements, for indicating the value of said torque.

3. In connection with a system including a driving element and a driven element, an apparatus for continuously measuring the torque transmitted from the first element to the second one, which comprises, in combination, at least one member pivotally connected to one of said elements and movably connected to the other of said elements, a mass rigid with said member operative by the centrifugal force resulting from the rotation of said elements for balancing the action of said torque on said member for a corresponding relative position of said member with respect to said elements, and means, responsive to displacements of said member from the position it would normally occupy under the mere action of the centrifugal force acting on said mass and to the speed of revolution of said elements, for indicating the value of said torque.

4. In connection with a system including a driving element and a driven element, an apparatus for continuously measuring the torque transmitted from the first element to the second one, which comprises, in combination, two circular elements coaxially and rigidly connected to said elements, respectively, one of these circular elements being toothed, a plurality of members pivoted to the other of said circular elements and having teeth adapted to mesh with the toothed circular element, a mass eccentrically carried by each of said members, for balancing the action of said torque on said members for a corresponding relative position of said members with respect to said circular elements, and means, responsive to the angular displacements of said members from the respective positions they would normally occupy under the mere action of the centrifugal force acting on their respective masses and to the speed of revolution of said circular elements, for indicating the value of said torque.

5. In connection with a system including a driving element and a driven element, an apparatus for continuously measuring the torque transmitted from the first element to the other one, which comprises, in combination, a plurality of members pivoted to one of said elements and movably connected to the other of said elements, a mass rigid with each of said members operative by the centrifugal force resulting from the rotation of said elements for balancing the action of said torque on said member for a corresponding relative angular position of said member with respect to said elements, and electrical means, responsive both to angular displacements of at least one of said members with respect to the element to which it is pivoted and to the speed of revolution of said elements, for indicating the value of said torque.

6. An apparatus according to claim 3 for measuring the torque transmitted from an aircraft engine to a propeller, in which all the parts are housed in the hub of said propeller.

7. In a device according to claim 1, said last means being electrical and comprising a resistance which is adjustable in accordance with the displacements of said member and also comprising a device for variation of an electrical value in accordance with the speed of revolution of said elements.

8. In a device according to claim 1, said last means being electrical and comprising a resistance which is adjustable in accordance with the displacements of said member and also comprising a device for variation of an electrical value in accordance with the speed of revolution of said elements, said device for variation of an electrical value in accordance with the speed of revolution of said elements is constituted by a D. C. dynamo driven at a speed depending on that of said elements.

9. In a device according to claim 1, said last means being electrical and comprising a resistance which is adjustable in accordance with the displacements of said member and also comprising a device for variation of an electrical value in accordance with the speed of revolution of said elements, said device for variation of an electrical value in accordance with the speed of revolution of said elements is constituted by a D. C. dynamo driven at a speed depending on that of said elements, and an indicating device comprising two coils, one of which is fixed and the other rotatable, one of said coils receiving a current directly supplied by said D. C. dynamo, the other one receiving a current, the intensity of which is modified by the resistance.

RAOUL ROLAND RAYMOND SARAZIN.